United States Patent
Vidal

(10) Patent No.: US 12,467,857 B2
(45) Date of Patent: Nov. 11, 2025

(54) MODULAR LANDFILL GAS MEASUREMENT

(71) Applicant: EcoTec Solutions, Inc., Colton, CA (US)

(72) Inventor: Alan Vidal, Fontana, CA (US)

(73) Assignee: EcoTec Solutions, Inc., Colton, CA (US)

( * ) Notice: Subject to any disclaimer, the term of this patent is extended or adjusted under 35 U.S.C. 154(b) by 304 days.

(21) Appl. No.: 18/043,530

(22) PCT Filed: Sep. 1, 2021

(86) PCT No.: PCT/US2021/048738
§ 371 (c)(1),
(2) Date: Feb. 28, 2023

(87) PCT Pub. No.: WO2022/051415
PCT Pub. Date: Mar. 10, 2022

(65) Prior Publication Data
US 2024/0027338 A1  Jan. 25, 2024

Related U.S. Application Data

(60) Provisional application No. 63/073,293, filed on Sep. 1, 2020.

(51) Int. Cl.
*G01N 21/3504* (2014.01)
*G01F 1/46* (2006.01)
*G01N 21/61* (2006.01)

(52) U.S. Cl.
CPC ........... *G01N 21/3504* (2013.01); *G01F 1/46* (2013.01); *G01N 21/61* (2013.01)

(58) Field of Classification Search
CPC .................................................. G01N 21/3504
See application file for complete search history.

(56) References Cited

U.S. PATENT DOCUMENTS

| 6,061,637 | A | 5/2000 | Sorge et al. |
| 10,705,063 | B2 * | 7/2020 | Campanella ............ E21B 36/00 |

(Continued)

FOREIGN PATENT DOCUMENTS

| CN | 105257408 A | 1/2016 |
| WO | WO 2013-175287 A2 | 11/2013 |
| WO | WO 2017/173402 A2 | 10/2017 |

OTHER PUBLICATIONS

International Search Report issued in PCT Application No. PCT/US2021/048738, dated Dec. 22, 2021, in three pages.

*Primary Examiner* — Casey Bryant
(74) *Attorney, Agent, or Firm* — Knobbe, Martens, Olson & Bear LLP

(57) ABSTRACT

A system may include a flow valve coupled to a gas inlet of a landfill gas system and a pump coupled to the flow valve and configured to draw gas from the landfill gas system via the gas inlet. The system may further include an oxygen sensor comprising at least one laser configured to detect oxygen concentration in the gas, a carbon dioxide sensor comprising at least one infrared light source configured to detect carbon dioxide concentration in the gas, and/or one or more chemical sensors configured to sense concentrations of a respective one or more chemicals in the gas. A microprocessor may determine sensed data including at least the oxygen concentration, the carbon dioxide concentration, concentrations of the one or more chemicals, the static pressure, the atmospheric pressure, and/or a differential pressure, and communicate the sensed data to a mobile control device.

13 Claims, 10 Drawing Sheets

(56) References Cited

U.S. PATENT DOCUMENTS

| | | |
|---|---|---|
| 2009/0200180 A1* | 8/2009 | Capote .................... F23G 5/085 |
| | | 205/744 |
| 2012/0297868 A1 | 11/2012 | Elkins |
| 2015/0362468 A1* | 12/2015 | Gerhold ............. G01N 33/0014 |
| | | 73/28.04 |
| 2017/0090486 A1 | 3/2017 | Chrin |
| 2018/0059003 A1* | 3/2018 | Jourdainne ............ G01K 13/00 |
| 2020/0086365 A1* | 3/2020 | Campanella ....... G01N 33/0063 |
| 2024/0142351 A1* | 5/2024 | Miller ................ G01N 33/0004 |

* cited by examiner

MODULAR LANDFILL GAS MEASUREMENT

CROSS-REFERENCE TO RELATED APPLICATIONS

This application is the U.S. National Phase of PCT/US2021/048738, filed Sep. 1, 2021, titled MODULAR LANDFILL GAS MEASUREMENT, which claims the benefit of U.S. Provisional Application Ser. No. 63/073,293, filed Sep. 1, 2020, titled MODULAR LANDFILL GAS MEASUREMENT, both of which are incorporated by reference herein in their entirety.

BACKGROUND

In this era of global warming, the reduction of greenhouse gases and, in particular, the reduction of carbon containing gas in the environment is highly desirable. Landfills typically include a considerable amount of organic material that is decomposing underground. Volatile carbon containing gases, such as methane, are often produced as a result of this decomposition process. If allowed simply to vent into the atmosphere, the amount of carbon contained in these gases can be substantial.

As a consequence, it is desirable to prevent as much of the carbon containing gases, such as methane, from landfills from venting into the atmosphere. Typically, landfills will have a plurality of wellheads that are positioned so as to capture the gases and the well heads are often linked together such that the gases are provided to one or more destruction devices. The destruction devices can, in the simplest implementation, be a furnace or flare that is lit which results in the volatile carbon containing gases burning thereby transforming a fraction of the gaseous carbon component into solid carbon which thereby removes it from the atmosphere.

As the decomposition process within a landfill is variable, it is often difficult to determine with a high level of certainty for any particular time interval the amount of volatile carbon gases that have been reduced. The constituent components of the volatile carbon gases will vary based upon the materials that are decomposing and the volume of the volatile carbon containing gases will also vary based upon a wide variety of factors. As a consequence, it is necessary to monitor the gas flow and constituent components of the gas flow as well as the performance of the device used to reduce the volatile carbon gases on a fairly frequent basis to make an assessment of the amount of carbon that has been removed from the atmosphere.

Consequently, the monitoring system for such variable carbon gas producing facilities, such as landfills, is necessarily complex and involves many highly sophisticated and sensitive sensors.

SUMMARY OF CERTAIN EMBODIMENTS

In one embodiment, a landfill gas monitoring system may include a flow valve (170) coupled to a gas inlet (112) of a landfill gas system; a pump (120) coupled to the flow valve and configured to draw gas from the landfill gas system via the gas inlet (112); an oxygen sensor (130) configured to access the gas drawn from the landfill gas system, the oxygen sensor may include at least one laser configured to detect oxygen concentration in the gas; a carbon dioxide sensor (140) configured to access the gas drawn from the landfill gas system, the carbon dioxide sensor may include at least one infrared light source configured to detect carbon dioxide concentration in the gas; one or more chemical sensors (150) configured to access the gas drawn from the landfill gas system, the chemical sensors configured to sense concentrations of a respective one or more chemicals in the gas; an exhaust port (114) configured to direct the gas into a methane detection device (160), where the methane detection device is configured to detect at least a methane concentration in the gas; a static pressure transducer (174) positioned between the flow valve and the gas inlet, the static pressure transducer configured to sense a static pressure when the flow valve is in a closed position; a barometric pressure transducer (176) coupled to the gas inlet, the barometric pressure transducer configured to sense an atmospheric pressure via a path to the atmosphere; one or more microprocessors (182) configured to determine sensed data including at least the oxygen concentration, the carbon dioxide concentration, concentrations of the one or more chemicals, the static pressure, the atmospheric pressure, and the differential pressure; and a communication interface (180) coupled to the microprocessor and configured to communicate the sensed data to a mobile control device (110).

Implementations of the landfill gas monitoring system may include one or more of the following features. The system may include a pitot tube housing a static pressure tube coupled to the static pressure transducer and a total pressure tube coupled to a differential pressure transducer configured to measure a total pressure, where velocity pressure may be determinable as a difference between the total pressure and the static pressure. The pitot tube may be positioned within an inlet pipe of the landfill gas system. The upstream pressure sensor may be positioned to sense an upstream pressure of gas flowing through the landfill gas system prior to flowing through the orifice plate and the downstream pressure sensor may be positioned to sense a downstream pressure of gas flowing through the landfill gas system after flowing through the orifice plate. The system may be configured to calculate a flowrate based on the upstream pressure and the downstream pressure. The system may include a differential pressure transducer (172) positioned between the flow valve and the gas inlet, the differential pressure transducer configured to sense a total pressure. The one or more chemical sensors may include one or more of an Oxygen sensor, a Carbon monoxide sensor, a Hydrogen sulfide sensor, a TBM sensor, or a THT sensor. Opening and closing of the flow valve may be controlled via communications from the control device. The static pressure and barometric pressure are usable to normalize the sensed data. The oxygen sensor does not require calibration.

In some embodiments, the methane detection device may be configured to: determine a temperature of a light source; based on the determined temperature, initiating activation of a cooling or a heating component associated with the light source to adjust the temperature to a predetermined first operating temperature, where the first operating temperature may be selected to produce a light beam from the light source at a first preselected wavelength for absorption by the first preselected gas; when the temperature of the light source has reached the first operating temperature, accessing measurement data from an optical detector, where with the light source at the predetermined first temperature the detection system may be configured to measure a first absorption of the light beam at the first preselected wavelength to provide an indication of a concentration of the first preselected gas within the sample gas; continuing to sample the environment by accessing the measurement data until the concentration of the first preselected gas exceeds a predetermined threshold; and responsive to the concentration of the first preselected gas exceeding the predetermined threshold: initiating activation of a cooling or heating component associated with the light source to adjust the temperature to a predetermined second operating temperature, where the second operating temperature may be selected to produce a light beam from the light source at a second preselected wavelength for absorption by the second preselected gas; and when the temperature of the light source has reached the second operating temperature, accessing measurement data from the optical detector, where with the light source at the predetermined second temperature the detection system may be configured to measure a second absorption of the light beam at the second preselected wavelength to provide an indication of a concentration of the second preselected gas within the sample gas.

In some embodiments, the system further comprises a main board comprising a computer processor and a plurality of receiving connectors each configured to couple with any one of a plurality of smart sensor block assemblies each including different sensors, wherein the receiving connectors provide respective communication paths between the computer processor and the coupled smart sensor block assemblies. A first smart sensor block assembly may include a first sensor of the chemical sensors, the first sensor configured to output first sensor data indicative of a first concentration of a first chemical, a first memory storing first configuration data associated with the first sensor, and a first adapting connector removably coupled to a first receiving connector of the main board, wherein the first adapting connector is configured to transmit the first configuration data from the first memory and the first sensor data to the first receiving connector, wherein the main board is configured to apply the first configuration data to the first sensor data to determine a first adjusted sensor data that is normalized with reference to other sensors. The system may further include a second smart sensor block assembly comprising a second sensor of the chemical sensors, the second sensor configured to output second sensor data indicative of a second concentration of a second chemical, a second memory storing second configuration data associated with the second sensor, and a second adapting connector removably coupled to a second receiving connector of the main board, wherein the second adapting connector is configured to transmit the second configuration data from the second memory and the second sensor data to the second receiving connector, wherein the main board is configured to apply the second configuration data to the second sensor data to determine a second adjusted sensor data that is normalized with reference to other sensors.

The first configuration data may include one or more of a first sensor type, information identifying the first chemical property, performance characteristics of the first sensor, or calibration information. The first configuration data may include calibration information based at least in part on a calibration procedure performed while the first smart sensor block assembly may be not coupled to the main board. The first configuration data includes one or more of an operating range of the first sensor, a calibration table, or instructions to perform one or more mathematical operations on the first sensor data. The first chemical may be one or more of carbon monoxide, hydrogen sulfide, hydrogen, tertio butyl mercaptan, or tetrahydrothiophene. Implementations of the described techniques may include hardware, a method or process, or computer software on a computer-accessible medium.

Landfill gas monitoring systems frequently contain several sensors for monitoring various aspects of air or other gases or fluids, such as chemical composition, temperature, pressure, humidity, or the like. In some embodiments, such an landfill gas monitoring system may be placed in one or more pipes of (and/or coupled to) a landfill gas system.

Calibration information typically must be determined individually for a particular sensor. Even sensors from a same manufacturer, make, and model, may require calibration to provide measurements that are consistent with other sensors, such as a sensor of the same type that is being replaced. As sensor technology improves or the monitoring needs change for a particular system or user, it is inconvenient or impracticable to replace, remove, or add new sensors, as such changes may require removing and/or transporting the entire monitoring system for calibration of a new sensor in the system, damaging the monitoring system (e.g. removal, dismantling, reassembling damage) and/or rendering the monitoring system entirely unusable (e.g., requiring replacement of the monitoring system altogether, as well as any of the one or more individual sensors that may be part of the monitoring system).

DETAILED DESCRIPTION

Figure 1:
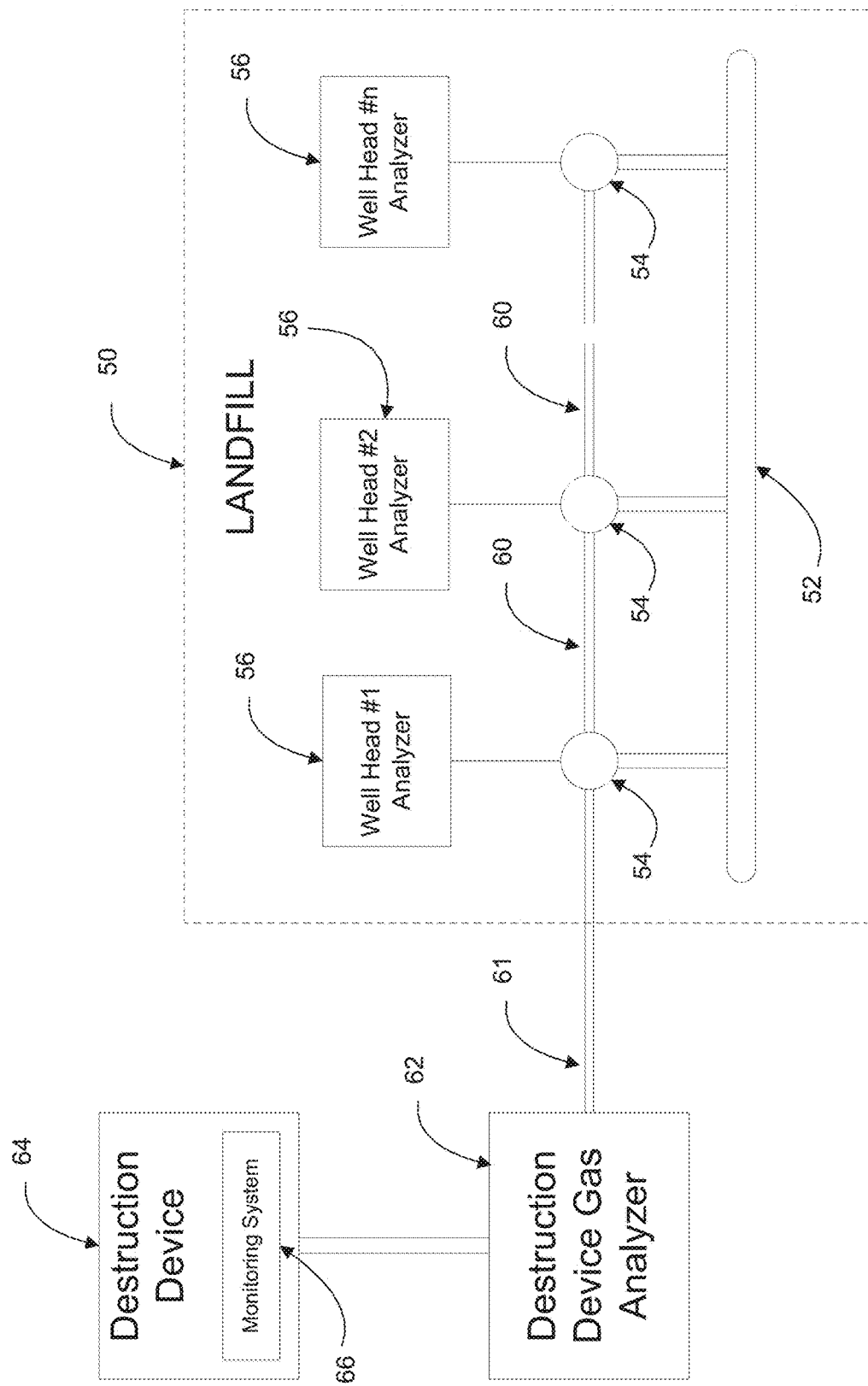
FIG. 1 is a block diagram illustrating an example system for capturing and reducing undesirable components of volatile gases off of a variable volatile gas source is illustrated.

Reference will now be made to the drawings wherein like numerals refer to like parts throughout. Referring initially to FIG. 1, a system for capturing and reducing undesirable components of volatile gases off of a variable volatile gas source is illustrated. In this particular implementation, the variable volatile gas source is a landfill which has a distributed quantity of decomposing organic material 52 that is buried underneath the ground. The exact composition of the decomposing material 52 varies widely as does the rate of decomposition as well as the constituent components of the decomposition. Volatile gases, such as methane, are produced as a result of the decomposing material 52 and the land fill 50 is thus equipped with a plurality of well heads 54 that are used to capture the volatile gases from the decomposing material 52. The amount, number and size of well heads will, of course, vary greatly depending upon the actual implementation. In this particular embodiment, a plurality of well head analyzers 56 are also installed on at least some of the well heads and the well head analyzers 56 measure such things the flow rate and the constituent components of the volatile gases read at a particular well head. In one particular implementation, the well head analyzers record an aggregate amount of gas that has flowed over a preselected period, e.g., over a day, multiple days or a week, as well as the gas pressure and gas composition also detected during the same time period.

As is also indicated in FIG. 1, the well heads 54 may be linked together via gas transportation systems 60 such that the volatile gases containing the undesirable constituents can be aggregated together and provided to a destruction device 64. The destruction device is a device that is adapted to remove the undesirable constituents out of the gas flow. The destruction device 64 can comprise such things such as scrubbers, filters, furnaces and flares. In one particular common implementation, the destruction device 64 comprises a flame burner or flare to which the volatile gas is provided such that the volatile gas can then be burned which results in at least a portion of volatile carbon gas being transformed into solid carbon and thereby removed from the atmosphere.

In order to determine the quantity of undesirable constituents, e.g., carbon components in the volatile gas stream that is removed, the aggregate volatile gas is fed into a destruction device gas analyzer 62 which monitors characteristics of the volatile gas flow including such things as the volume, rate and pressure of gas flow, as well as other characteristics, such as the temperature of the gas flow and the constituent components or the composition of the gas flow including, for example, the amount of volatile carbon containing gases.

As is also indicated in FIG. 1, the destruction device further includes a monitoring system 66 that monitors the characteristics of the destruction device such that the characteristics of the destruction device can be used to calculate the amount of the undesirable constituents that have been reduced out of the gas flow. In one particular implementation, the destruction device 64 comprises a flare and the monitoring system comprises a plurality of sensors that measures such things such as the heat energy produced when the volatile gas is burned as well as the constituents components of the gas flow residing following the burning of the volatile gas being supplied from the volatile gas source 50.

Hence, the system disclosed in FIG. 1 comprises a system which accumulates a volatile gas flow that has some undesirable constituents, such as carbon and then provides this to a destruction device which is designed to remove at least a portion of the undesirable characteristics and the system further includes a plurality of different sets of sensors that measure data indicative of the characteristics of the gas flow at different locations and possibly different sampling rates. It will be appreciated that the exact configuration of the system for accumulating, assessing, and reducing volatile gas flows with undesirable constituents can, of course, vary greatly depending upon the implementation without departing from the spirit of the present teachings.

Figure 2:
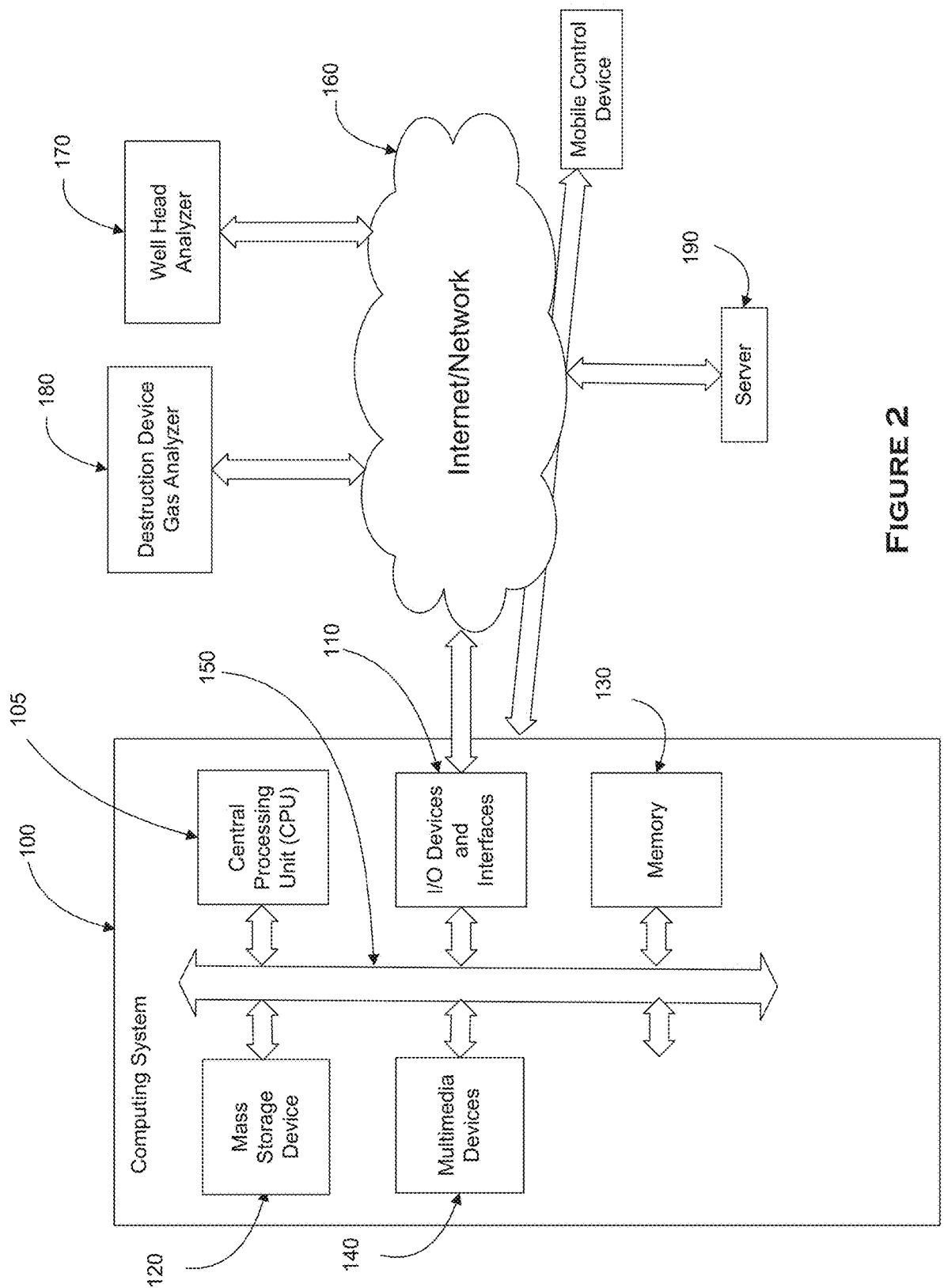
FIG. 2 is block diagram illustrating an example system by which a calculated quantity of undesirable constituents in the volatile gas flow may be determined.

FIG. 2 is an exemplary block diagram illustrating the system by which a calculated quantity of undesirable constituents in the volatile gas flow may be determined. This particular system comprises a computer-based system 100 and can include, for example, a personal computer that is IBM, Macintosh, or LINUX/UNIX compatible. In one embodiment, the exemplary computing system 100 includes a central processing unit 105 that may include a conventional microprocessor. The computing system 100 further includes a memory 130 such as a Random Access Memory (RAM) for temporary storage of information, a Read Only Memory (ROM) for permanent storage of information, a mass storage device 120 such as a hard drive, diskette or optical media storage device.

The mass storage device 120 includes such data as previously captured data that is stored in a well known manner. The previously captured data can then be used to validate newly received by though comparison of historical averages, most recent averages and the like.

Typically, the modules of the computing system 100 are connected to the computer using a standard based bus system. In different embodiments, the standard based bus system can include peripheral component interconnect (PCI), micro channel, SCSI, Industrial Standard Architecture (ISA), and Extended ISA (EISA) architectures, for example. The computing system 100 is generally controlled and coordinated by operating system software such as Windows 95, 98, NT, 2000, XP, LINUX, SUN OS, Solaris, or other compatible operating systems. In Macintosh systems the operating system may be any available operating system such as MAC OSX. In other embodiments, the computing system 100 may be controlled by a proprietary operating system. Conventional operating systems control and schedule computer processes for execution, perform memory management, provide file systems, networking and IO services, and provide a user interface, such as a Graphical User Interface (GUI) among other things.

The exemplary computing system 100 includes one or more commonly available Input/Output (I/O) devices and interfaces 110, such as a keyboard, mouse, touchpad and printer. In one embodiment, the I/O device and interfaces include one or more display devices, such as a monitor, that allows the visual presentation of data to a user. More particularly, a display device provides for the presentations of GUI's, application software data, and multimedia presentations, for example. The computing system 100 may also include one or more multimedia devices 140, such as speakers, video cards, graphic accelerators and microphones, for example.

In the embodiment of FIG. 2, the I/O devices and interfaces 110 provide a communications interface to various external devices. In the embodiment of FIG. 2, the computing system 100 is coupled to a network 160 such as a LAN, WAN, or the Internet, for example via a wired, wireless or combination of wired and wireless communications links 115. The network communicates with various computing devices and/or other electronic devices via wired and wireless communications links. In the exemplary embodiment of FIG. 1, the computing device 100 communicates with the destruction device gas analyzer 62 and the monitoring system 66 for the destruction device via the network. Similarly, readers that read the well head analyzer 56 can also provide the data to the computing system 100 via the network. The system further includes a server 190 that is attached to the computing system 100 also via the network.

Hence, the computing system 100 is capable of receiving data indicative of the volatile gas flow from not only the destruction device gas analyzer 62 and the associated destruction device monitoring system 66, but can also receive data taken from each of the well head analyzers 56 using a well head data analyzer monitor 170. While this data is indicated in FIG. 2 as being provided via the Internet or network, it will also be appreciated that this data can be provided to the computing system 100 in a variety of different formats including such things as by manual input of the data at an I/O device, physical transportation of a reader from the well head analyzers to the computing systems, paging and text messaging without departing from the spirit of the present teachings.

Figure 3:
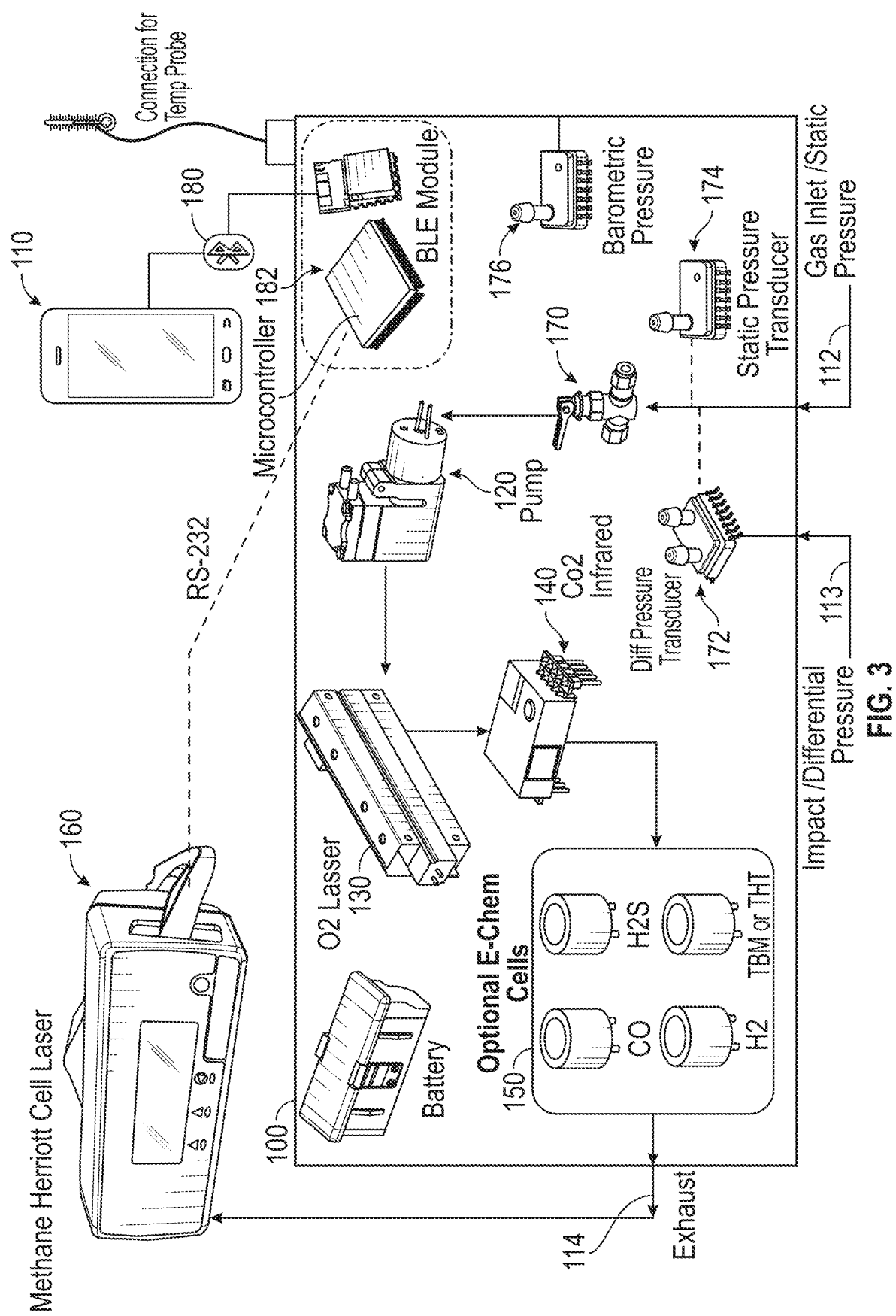
FIG. 3 is a block diagram of example components that may be used in a landfill gas monitoring system.

FIG. 3 is a block diagram of example components that may be used in a landfill gas monitoring system. Depending on the embodiment, the components may be included in one or more of the well head analyzers (e.g., analyzers 56 of FIG. 1 or analyzer 170 of FIG. 2), the computing system 100, and/or one or more other devices. In the example of FIG. 3, the landfill gas monitoring system includes a flow valve (170) coupled to a gas inlet (112) of a landfill gas system; a pump (120) coupled to the flow valve and configured to draw gas from the landfill gas system via the gas inlet (112); an oxygen sensor (130) configured to access the gas drawn from the landfill gas system, the oxygen sensor may include at least one laser configured to detect oxygen concentration in the gas; a carbon dioxide sensor (140) configured to access the gas drawn from the landfill gas system, the carbon dioxide sensor may include at least one infrared light source configured to detect carbon dioxide concentration in the gas; one or more chemical sensors (150) configured to access the gas drawn from the landfill gas system, the chemical sensors configured to sense concentrations of a respective one or more chemicals in the gas; an exhaust port (114) configured to direct the gas into a methane detection device (160), where the methane detection device is configured to detect at least a methane concentration in the gas; a static pressure transducer (174) positioned between the flow valve and the gas inlet, the static pressure transducer configured to sense a static pressure when the flow valve is in a closed position; a barometric pressure transducer (176) coupled to the gas inlet, the barometric pressure transducer configured to sense an atmospheric pressure via a path to the atmosphere; one or more microprocessors (182) configured to determine sensed data including at least the oxygen concentration, the carbon dioxide concentration, concentrations of the one or more chemicals, the static pressure, the atmospheric pressure, and the differential pressure; and a communication interface (180) coupled to the microprocessor and configured to communicate the sensed data to a mobile control device (110).

In some embodiments, the landfill gas monitoring system may include a pitot tube housing a static pressure tube coupled to the static pressure transducer and a total pressure tube coupled to a differential pressure transducer configured to measure a total pressure, where velocity pressure may be determinable as a difference between the total pressure and the static pressure. The pitot tube may be positioned within an inlet pipe of the landfill gas system. The upstream pressure sensor may be positioned to sense an upstream pressure of gas flowing through the landfill gas system prior to flowing through the orifice plate and the downstream pressure sensor may be positioned to sense a downstream pressure of gas flowing through the landfill gas system after flowing through the orifice plate. The system may be configured to calculate a flowrate based on the upstream pressure and the downstream pressure. The system may include a differential pressure transducer (172) positioned between the flow valve and the gas inlet, the differential pressure transducer configured to sense a total pressure. The one or more chemical sensors may include one or more of an Oxygen sensor, a Carbon monoxide sensor, a Hydrogen sulfide sensor, a TBM sensor, or a THT sensor. Opening and closing of the flow valve may be controlled via communications from the control device. The static pressure and barometric pressure are usable to normalize the sensed data. The oxygen sensor does not require calibration.

In some embodiments, the methane detection device may be configured to: determine a temperature of a light source; based on the determined temperature, initiating activation of a cooling or a heating component associated with the light source to adjust the temperature to a predetermined first operating temperature, where the first operating temperature may be selected to produce a light beam from the light source at a first preselected wavelength for absorption by the first preselected gas; when the temperature of the light source has reached the first operating temperature, accessing measurement data from an optical detector, where with the light source at the predetermined first temperature the detection system may be configured to measure a first absorption of the light beam at the first preselected wavelength to provide an indication of a concentration of the first preselected gas within the sample gas; continuing to sample the environment by accessing the measurement data until the concentration of the first preselected gas exceeds a predetermined threshold; and responsive to the concentration of the first preselected gas exceeding the predetermined threshold: initiating activation of a cooling or heating component associated with the light source to adjust the temperature to a predetermined second operating temperature, where the second operating temperature may be selected to produce a light beam from the light source at a second preselected wavelength for absorption by the second preselected gas; and when the temperature of the light source has reached the second operating temperature, accessing measurement data from the optical detector, where with the light source at the predetermined second temperature the detection system may be configured to measure a second absorption of the light beam at the second preselected wavelength to provide an indication of a concentration of the second preselected gas within the sample gas.

Example Modular Functionality

FIGS. 3A-3D are block diagrams illustrating example implementations of modular functionality, such as may be used in the landfill gas monitoring system discusses above. For example, the modular components and related functionality may be used in conjunction with the chemical sensors (e.g., the CO, H2S, H2, TBM, THT sensors) and/or any of the other sensors illustrated in FIG. 3 or other sensors. In these examples, sensors are illustrated as coupled to a "smart block assembly", which provides a common interface for coupling to a main board. For example, a smart block assembly may include a particular PIN configuration (e.g. a 9, 18, 24, 36 pin interface of a particular arrangement, such as any currently available or later developed hardware interface) that allows easy attachment and detachment of any of multiple sensors that might be coupled to the smart block assembly easily to the mainboard. In some embodiments, the smart sensor system may be configured to receive sensor data wirelessly from one or more sensors in addition to, or as an alternative to, receiving data via one or more sensors that are physically coupled to the smart sensor system.

Advantageously, each sensor can be coupled to a smart block assembly to provide a standard coupling interface for connection with the mainboard. Depending on the embodiment, each smart block assembly may include a memory that stores calibration information for the particular sensor (such as may be determined by a manufacturer of the smart sensors at a factory where the smart block sensors are created). The memory may include any available volatile or nonvolatile memory, such as random access memory (RAM), read only memory (ROM), a FLASH storage device, etc. In some embodiments, the memory is configured for upgradability, such as updates to the "firmware" via the mainboard while the corresponding sensor remains in place within the smart sensor system. Thus, updates to the operational parameters, code, settings, etc. of a sensor may be adjusted without the need to physically access the sensors. In some embodiments, calibration information (e.g., that is stored in the memory of the smart block assembly) is usable by the mainboard to allow more accurate sensor readings than would be possible in an uncalibrated sensor, while not requiring the mainboard to perform such calibration.

As shown in FIGS. 3A-3D, each smart sensor block assembly 302a, 302b, 302c, 302d, etc. includes a sensor 304a, 304b, 304c, 304d, etc., a smart block 306a, 306b, 306c, 306d, etc., and an adapting connector 308a, 308b, 308c, 308d, etc. The main board 310 includes a CPU 314 and/or other processing circuitry, a memory 316, and one or more peripheral interfaces 318. The main board 310 further includes a plurality of receiving connectors 312. In some embodiments, the receiving connectors 312 of a main board 310 can all be of the same type, for example, if the various adapting connectors 308a, 308b, 308c, 308d, etc. of smart sensor block assemblies 302a, 302b, 302c, 302d, etc. to be used with the main board 310 are configured to connect with a common type of receiving connector 312. In other embodiments, the receiving connectors 312 can include two or more different types of connectors, for example, if at least some of the various adapting connectors 308a, 308b, 308c, 308d, etc. are not configured to connect with a common type of receiving connector 312.

In this example, the adapting connectors 308 (e.g., 308a, 308b, 308c, 308d) are configured to connect the smart sensor block assemblies 302 (e.g., 302a, 302b, 302c, 302d) to the main board 310. As will be described in greater detail, the adapting connectors 308 can vary based on the type of sensor 304 (e.g., 304a, 304b, 304c, 304d), main board 310, and/or other components of the smart sensor system 300.

Generally, the combination of a sensor 304, a smart block 306, and an adapting connector 308 results in a smart sensor block assembly 302. In various embodiments, the sensor 304, smart block 306, and adapting connector 308 may be coupled by the same or different coupling methods. In one example, the sensor 304 and the smart block 306 may be assembled with soldered or non-permanent connections (e.g., press fit connections) and calibrated together. Once calibrated, they may remain as a "set." The adapting connector 308 may be fit to the sensor 304 and smart block 306 assembly with soldered or non-permanent connections (e.g., press fit connections) once it is determined what type of main board 310 it will be attached to. In some embodiments, the components of the smart sensor block assemblies may be fabricated as a single unit, such as may be provided by the provider of the main board and/or other third party sensor providers. Thus, smart sensor block assemblies may be manufactured and sold for use with the particular mainboard such that no additional coupling (e.g., between a sensor, sensor block, and/or adapting connector) may be required.

The receiving connector 312 of the main board 310 is configured to electrically couple with and receive a signal from the adapting connector 308 of the smart sensor block assembly 302. The quantity and type of receiving connectors 312 on a main board 310 may vary depending on a configuration of the main board 310 so as to accommodate a desired number and/or type of sensors 304. Receiving connectors 312 may include any one or more of various IEEE connector types and/or proprietary connector types. In various embodiments, the connection between the adapting connector 308 and the receiving connector 312 may be a direct rigid connection or may be a wired/cable connection.

The main board 310 receives information from the smart sensor block assembly 302 to determine how to process the measurement data received. The main board 310 typically contains a significant portion of the computing resources of the smart sensor system 300 and may further perform interfacing functions to peripheral items, such as a user keyboard, display, power source, sampling mechanisms, sensors, indication lights, network communications, alert generation, or the like. The main board 310 may also contain circuitry configured to perform other functions for wireless or wired connectivity (e.g., Ethernet, serial communications, Bluetooth, Wi-Fi, near field communications, RF transmission, or the like) to other computing systems. Wireless communications may be incorporated onto the main board 310 to allow data transmission to other computing devices such as handheld data collectors and servers for internet based software applications, such as a smartphone, tablet, or other mobile device for controlling, receiving data from, or otherwise interacting with the smart sensor system 300. In addition to information received from the smart sensor block assembly 302 and other data sent to the internet application servers, main board 310 application updates can be downloaded and applied.

In some embodiments, the main board 310 includes additional environmental sensors, such as one or more pressure sensors, temperature sensors, humidity sensors, or the like, that provide environmental input that is used to adjust or correct readings from a sensor 304 coupled to the main board 310. For example, calibration information for a particular sensor 304 may include an indication that the sensor 304 is sensitive and/or accurate in a given set of environmental conditions, such as within a particular temperature range. Calibration information may further indicate one or more tables and/or mathematical relationships for adjusting the data received from the smart sensor block assembly 302 based on variation in a given environmental aspect, such as temperature or pressure. The main board 310 may accordingly monitor temperature and adjust or correct sensor readings from that particular sensor 304 when temperature is outside of the calibration temperature range. In some embodiments, correction factors are provided in the calibration data stored on the smart sensor block assembly 302, such as to indicate a multiplier (or other mathematical function to be applied) by which to increase or decrease a sensor reading based on a current environmental reading (e.g. a current temperature or humidity).

Figure 3A:
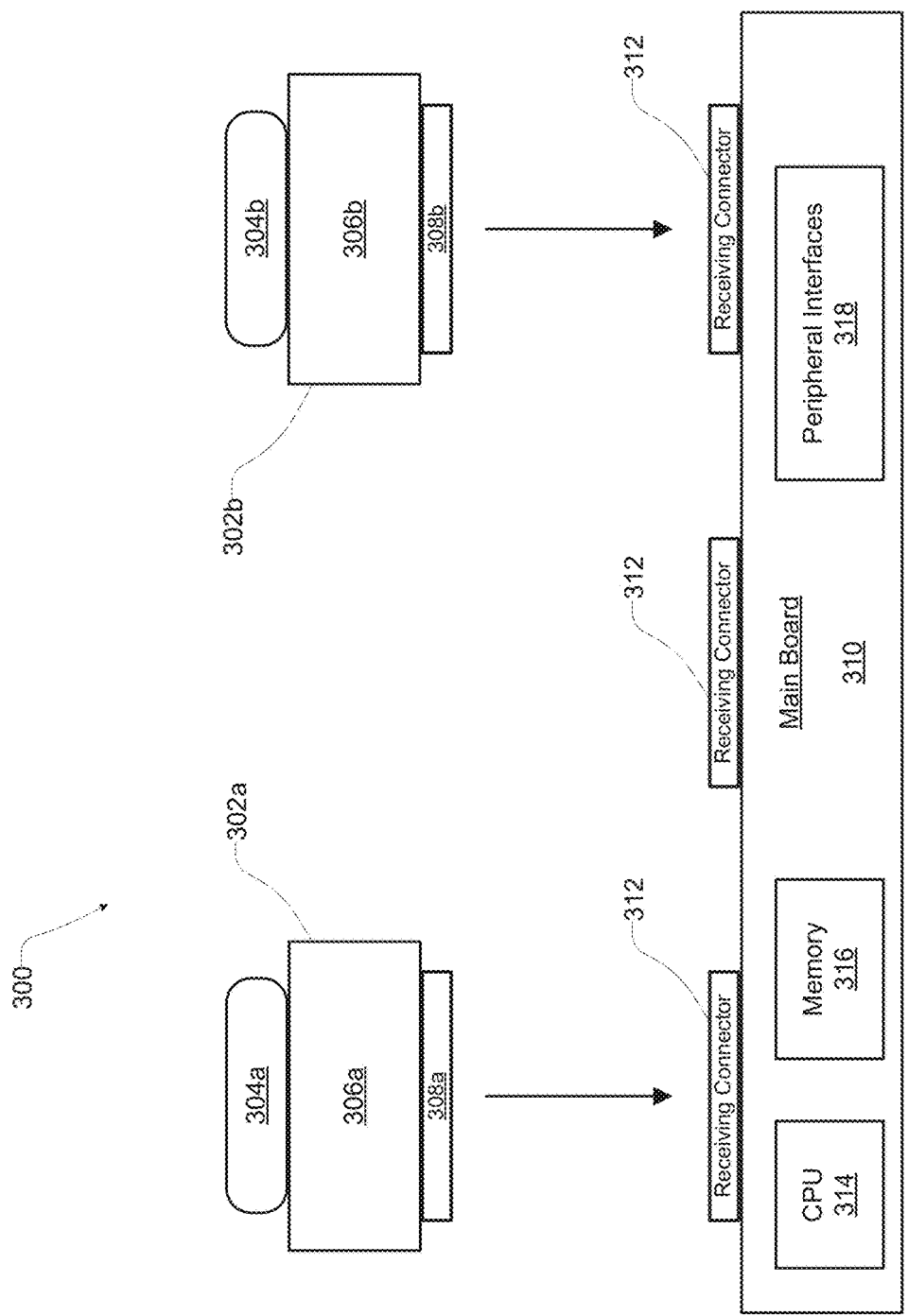
FIGS. 3A-3D are block diagrams illustrating example implementations of modular functionality, such as may be used in the landfill gas monitoring system discusses above.

With continued reference to FIG. 3A, one or more smart sensor block assemblies 302a, 302b are coupled to receiving connectors 312 of the main board 310. Smart sensor block assemblies 302a and 302b can include the same or different types of sensors 304a, 304b. In one illustrative example, smart sensor block assembly 302a can be an infrared smart sensor block assembly 302a including an infrared sensor 304a, and smart sensor block assembly 302b can be a chemical smart sensor block assembly 302b including a chemical sensor 304b. Smart sensor block assemblies 302a and 302b can be coupled to the receiving connectors 312 to form the assembled configuration of the smart sensor system 300 depicted in FIG. 3B.

Figure 3B:
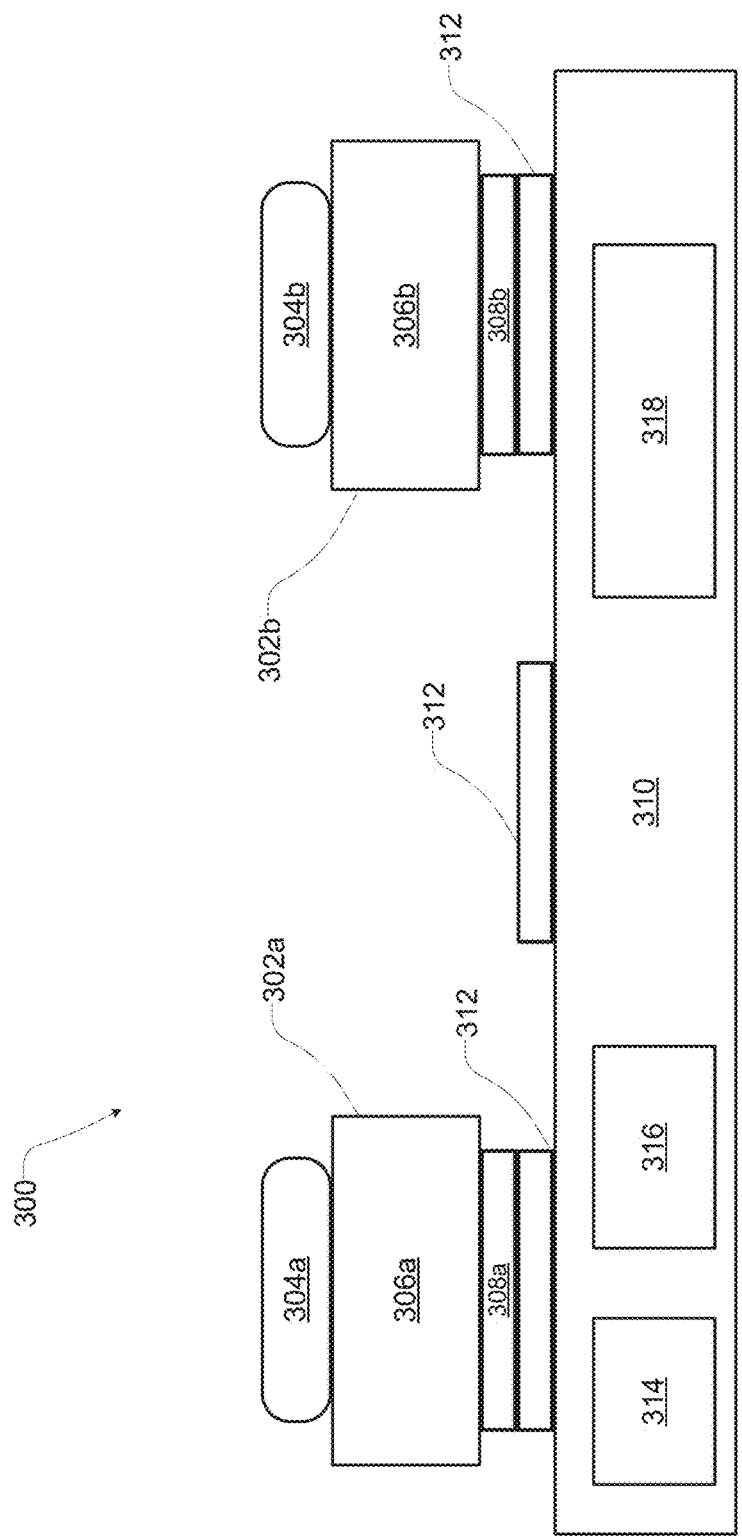

As shown in FIG. 3B, the adapting connectors 308a, 308b of the smart sensor block assemblies 302a, 302b are coupled to receiving connectors 312 such that data can be transferred between the main board 310 and the smart sensor block assemblies 302a, 302b. Data that can be transferred may include calibration data, measurements obtained at the sensors 304a, 304b, or other data.

Figure 3C:
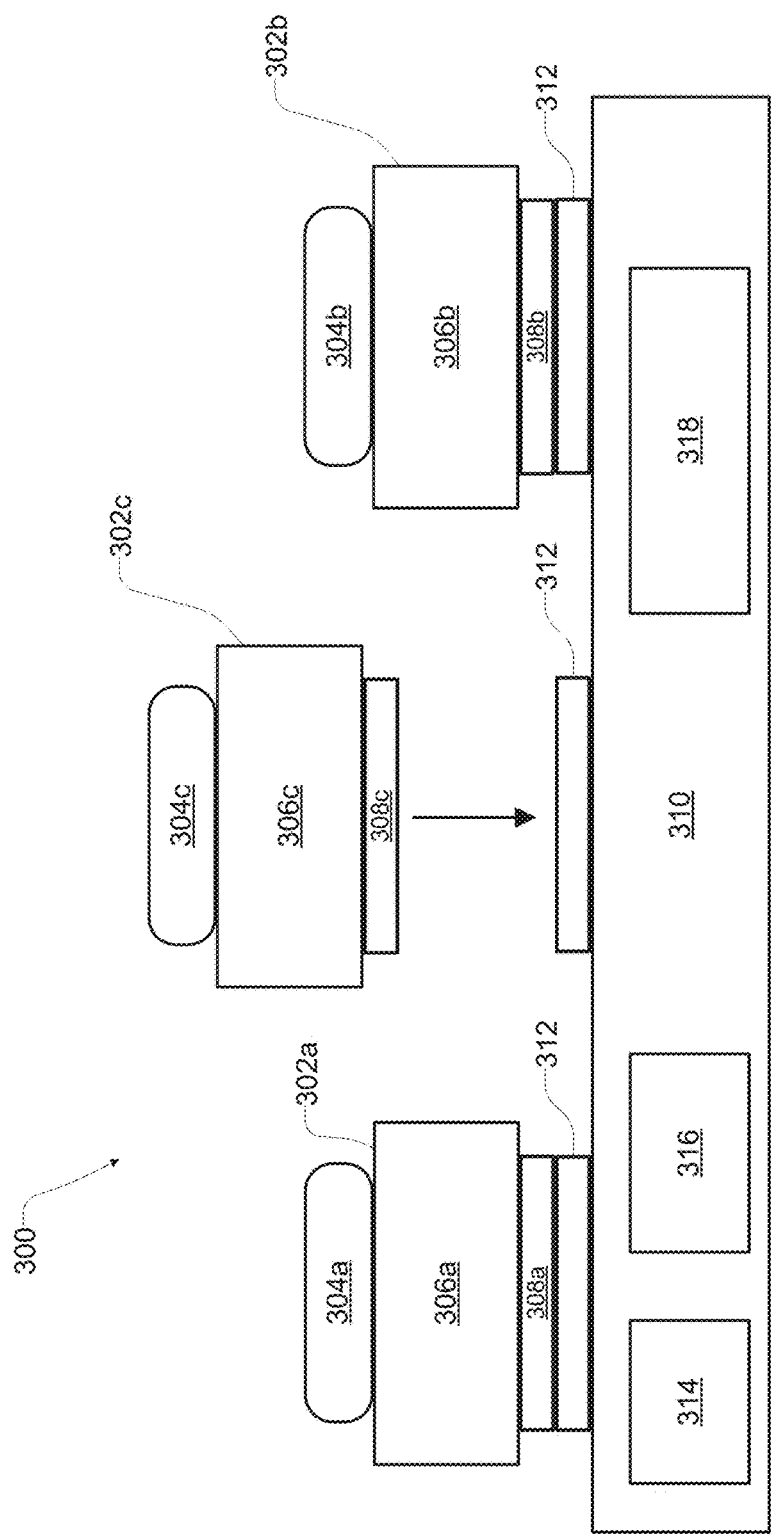

In some embodiments, with reference to FIG. 3C, one or more additional smart sensor block assemblies 302c may be added to the smart sensor system 300. An additional smart sensor block assembly 302c can be added at any time when at least one receiving connector 312 compatible with the adapting connector 308c of the additional smart sensor block assembly 302c is unoccupied on the main board 310. In the illustrative example where the system 300 already has an infrared smart sensor block assembly 302a and a chemical smart sensor block assembly 302b, the additional smart sensor block assembly 302c may be, e.g., a laser absorption spectroscopy smart sensor block assembly 302c including a laser absorption spectroscopy sensor 304c. Thus, the detection capability of the smart sensor system 300 can be augmented at any time by adding an additional sensor of a type different from the sensors already in place on the main board 310.

Figure 3D:
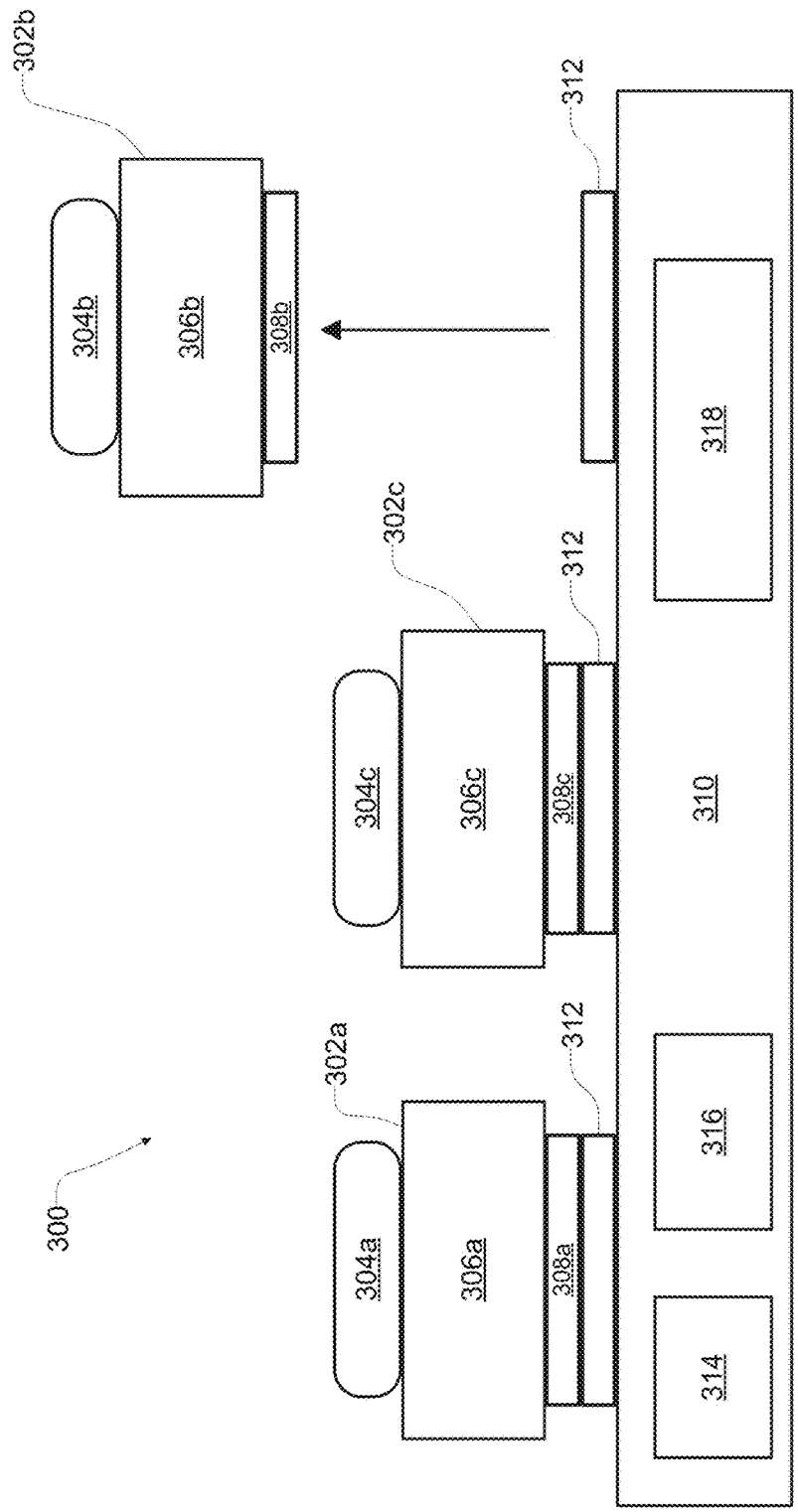

In certain embodiments, with reference to FIGS. 3D and 3E, one or more smart sensor block assemblies 302a, 302b, 302c coupled to the main board 310 may be removed from the smart sensor system 300 and/or replaced by a further smart sensor block assembly 302d. A user of the smart sensor system 300 may wish to remove and/or replace a smart sensor block assembly 302b from the main board 310, for example, if the landfill gas condition measured by the smart sensor block assembly 302b no longer needs to be measured, or if a different landfill gas condition is to be measured, due to a change or modification in the user's landfill gas monitoring requirements. In another example, a user may wish to replace one smart sensor block assembly 302b due to an improved sensor being available or to replace a malfunctioning smart sensor block assembly 302b with a functional replacement of the same type.

As shown in FIG. 3D, smart sensor block assembly 302b can be removed from the main board 310 by uncoupling the adapting connector 308b of the smart sensor block assembly 302b from the corresponding receiving connector 312 of the main board 310.

Thus, the configurations of the smart sensor system 300 shown in FIGS. 3A-3D illustrate the customizable or plug-and-play functionality of the systems described herein. Accordingly, it will be appreciated that a user of the smart sensor systems 300 depicted herein may utilize a common main board 310 with any combination of smart sensor block assemblies 302a, 302b, 302c, 302d, etc., which may be augmented or changed at any time so as to customize the conditions measured by the smart sensor system 300 as desired. Moreover, the pre-calibration of sensors and smart sensor block assemblies can allow a user to separately purchase individual smart sensor block assemblies for use with the common main board 310 without having to perform additional calibration steps before using newly added sensors in the smart sensor system 300.

Example Natural Gas Detector

In some embodiments, the methane detection device 160 (FIG. 3) may include a gas detection device that uses nondispersive infrared (NDIR) detection systems, such as is discussed below with reference to FIGS. 4-6. In these examples, an active channel of an NDIR sensor, also referred to as a gas-specific channel, may include a bandpass optical filter configured to pass a range of wavelengths of infrared light including wavelengths that are heavily absorbed by a target gas, such as methane, for which a concentration is to be detected. The amount of light detected may be compared to the amount of light detected by a reference channel which is unfiltered or has an optical filter configured to pass wavelengths not absorbed by the target gas. However, other constituent gases in a mixed gas, such as natural gas, may also absorb a significant amount of light within the wavelength range passed by the bandpass optical filter of the active channel. Thus, an active channel configured to detect a particular gas may also be sensitive to other gases that are not intended to be measured. Furthermore, in some instances a detector may be overly sensitive to the presence of gases other than the target gas due to different infrared absorption characteristics of the gases. In the example context of natural gas, gases such as ethane and/or propane may absorb significantly more infrared light than methane, even in wavelength ranges in which methane has absorption peaks. Thus, while a single-channel NDIR detector may be accurate for detecting a concentration of methane in the absence of ethane and propane, a small amount of either ethane or propane in the mixed gas may produce a significant error in the detected concentration of methane. Furthermore, presence of ethane or propone in a single-channel NDIR detector configured to measure methane may not be detectable, thereby introducing errors in methane measurements that are unknown to the user.

As noted with reference to the example above, difficulties associated with oversensitivity to unwanted gases may be especially prevalent with gases containing constituent gases having similar absorption spectra. For example, natural gas may contain several simple hydrocarbon gases that may have partially overlapping absorption spectra (e.g., methane, ethane, propane, etc.). Accordingly, in some implementations, NDIR sensors may be implemented with additional active channels, each having a bandpass optical filter configured to pass a different range of wavelengths. An absorption may be detected for each active channel, and the relative concentrations of multiple constituent gases may be separately calculated based on the detected absorptions in the active channels. Additionally, the relationship between detection accuracy or sensitivity of a constituent gas may be adjusted (e.g., weighted) based on known impacts of a particular combination of constituent gases.

Figure 4:
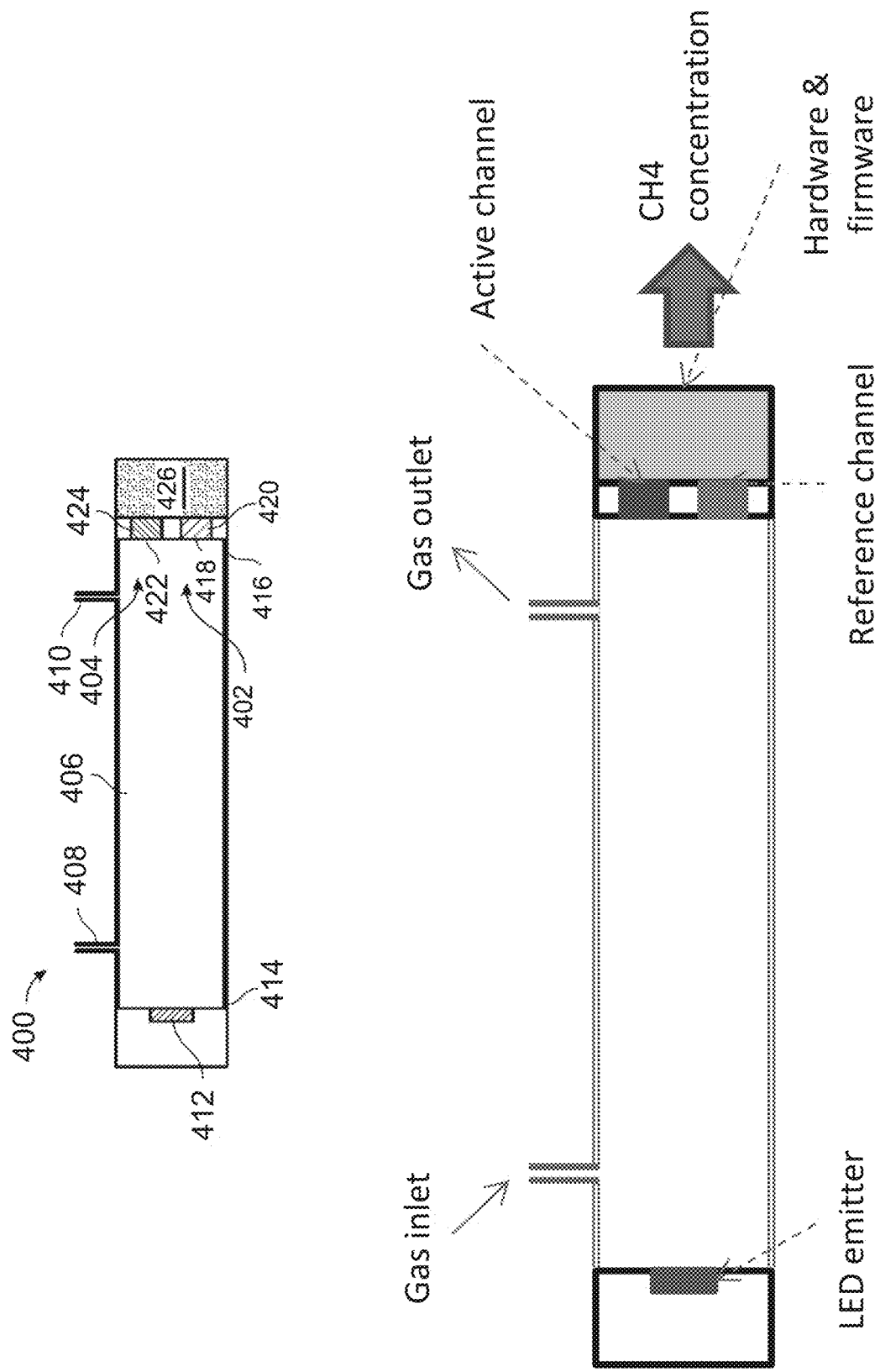
FIG. 4 is a schematic view of a simplified NDIR sensor having a reference channel and a single active channel.

FIG. 4 is a schematic view of a simplified NDIR sensor 400 having a reference channel 402 and a single active channel 404. A sample chamber 406 includes a gas inlet 408 and a gas outlet 410 configured to allow a volume of gas to be cycled through the sample chamber. A light source 412, such as a light emitting diode (LED) or other light source, configured to emit infrared wavelengths is located at a first end 414 of the sample chamber 406 and positioned to emit infrared light across the volume of gas within the sample chamber 406. For example, the light source 412 may be configured to emit light in a range of wavelengths such as 750 nm to 10,000 nm, or any smaller range, such as 3,000 nm to 4,000 nm. The light source 412 may be selected to emit an appropriate range corresponding to absorption spectra of particular gases to be detected. For example, if the sensor 400 is to be used to detect natural gas that is known to likely include constituent gases such as methane, ethane, and propane, the light source 412 may be selected to emit light between 3,000 nm and 4,000 nm, where methane, ethane, and propane have significant infrared absorption peaks. In this example embodiment, the reference channel 402 and the active channel 404 are located at a second end 416 of the sample chamber 406 opposite the light source 412 at the first end 414.

The reference channel 402 can include an optical filter 418 and a photodetector 420. Similarly, the active channel 404 can include an optical filter 422 and a photodetector

424. For example, the optical filters 418, 422 may be bandpass filters configured to pass light having a desired range of wavelengths (e.g., the wavelength of the constituent gas to be measured), and/or to attenuate and/or block light having wavelengths outside the desired range. Each optical filter 418, 422 may be an absorptive filter, a dichroic filter, or other type of optical filter. The photodetectors 420, 424 of the reference channel and the active channel can be coupled to processing circuitry 426 or other hardware having software and/or firmware configured to receive data from the photodetectors 420, 424 and store, analyze, or otherwise process the received data.

In one example, the sensor 400 may be configured to detect a concentration of methane ($CH_4$) in the gas being cycled through the sample chamber 406 via the gas inlet 408 and the gas outlet 410. Accordingly, the bandpass optical filter 422 of the active channel 404 may be configured to pass light in a range of wavelengths containing absorption peaks in the infrared absorption spectrum of methane. For example, the optical filter 422 of the active channel 404 may be configured to selectively pass light having a wavelength between 3250 nm and 3350 nm, which includes most observed peaks of the infrared absorption spectrum for methane. The optical filter 418 of the reference channel 402 may be configured to pass light in a range of wavelengths in which methane does not heavily absorb infrared light, such as between 3350 nm and 3450 nm. The wavelengths selected in the reference channel 402 may be determined so as to pass light primarily in wavelengths not heavily absorbed by the expected constituent gases in the sample gas. Each optical filter 418, 422 of the reference channel 402 and the active channel 404 has a transmission coefficient, generally defined as the portion of the light incident on the filter that passes through and is not reflected or absorbed by the filter 488, 422, measured in terms of amplitude and/or intensity of the light. Preferably, the transmission coefficient of the reference channel filter 418 can be similar or equal to the transmission coefficient of the active channel filter 422 (e.g., within 5%, 10%, or similar), such that differences in detected absorption between the different photodetectors 420, 424 can be indicative of absorption by the sample gas without requiring additional correction for inconsistent absorption between the optical filters 418, 422. Thus, light may be emitted by the light source 412, and at least a portion of the light can be detected at the photodetectors 420, 424 of the active channel 402 and the reference channel 404. The intensities of light detected may be sent to the processing circuitry 426.

At the processing circuitry 426, an absorbance of the light in the active channel 404 may be determined using any suitable algorithm, such as mathematical operations consistent with Beer's Law or the like. For example, a number indicative of an intensity of light detected at the active channel 404 may be divided by a number indicative of an intensity of light detected at the reference channel 402 to determine an absorbance. The concentration of the constituent gas can then be determined based on the calculated absorbance of infrared light in the selected wavelength range passed by the active channel filter 422. In an example implementation, such a calculation can be performed using an equation of the form:

$$A = \log_{10}\left(\frac{\phi^i}{\phi^t}\right),$$

where A is the absorbance to be calculated, $\phi^i$ is the radiant flux of the incident light emitted by the light source 412, and $\phi^t$ is the radiant flux of the transmitted light which passes through to the photodetector 422. Because the wavelengths of light passed by the reference channel filter 418 are not absorbed by the sample gas, and transmission coefficients of the optical filters 418, 422 are substantially equal, the radiant flux of the emitted light in a gas-specific active channel 404 can be substantially equal to the radiant flux detected at the photodetector 420 of the reference channel 402. Thus, the absorbance equation given above can be evaluated for a gas-specific active channel 404 by taking the base-10 logarithm of the ratio of the radiant flux detected in the reference channel 402 to the radiant flux detected in the active channel 404. In a more concrete example, a reference channel 402 detects a radiant flux of 1 mW and a gas-specific active channel 404 detects a radiant flux of 0.99995 mW. The ratio $\phi^i/\phi^t$ would thus be approximately 1.00005. The absorbance A for the wavelength band passed by the optical filter 422 of the active channel 404 could then be calculated as $A=\log_{10}$ (1.00005), yielding an absorbance of $A=2.17\times10^{-5}$. In various embodiments, smaller absorbances on the order of $10^{-6}$, $10^{-7}$, $10^{-8}$, $10^{-9}$, $10^{-10}$, or smaller may be accurately detected, based on the resolution of the photodetectors 420, 424.

A source of inaccuracy associated with detecting a concentration of a target gas in a mixed gas using the single active channel method described above may be the relative absorbance due to other gases present in the mixed gas. In one exemplary implementation, various natural gas compositions may contain a majority of methane, with ethane and propane comprising a smaller portion of the natural gas. For example, the methane concentration may range from 82% to 98% by volume, while ethane may range from 3% to 8% and propane may range from 0.5% to 2% by volume. However, in the wavelength ranges typically used for NDIR natural gas detection (e.g., infrared wavelengths), the absorbance associated with approximately 1% by volume of ethane may be equivalent to the absorbance associated with approximately 13% by volume of methane. The absorbance associated with approximately 5% by volume of ethane may be equivalent to the absorbance associated with approximately 400% by volume of methane. Thus, a relatively small ethane concentration in a natural gas sample can prevent such systems from accurately determining the methane concentration. This difficulty may be corrected for by calibration to take into account the greater absorbance by methane. However, such calibration is accurate only for a particular gas composition, making a calibrated single active channel sensor useful only for detecting a concentration of a particular gas composition.

Figure 5A:
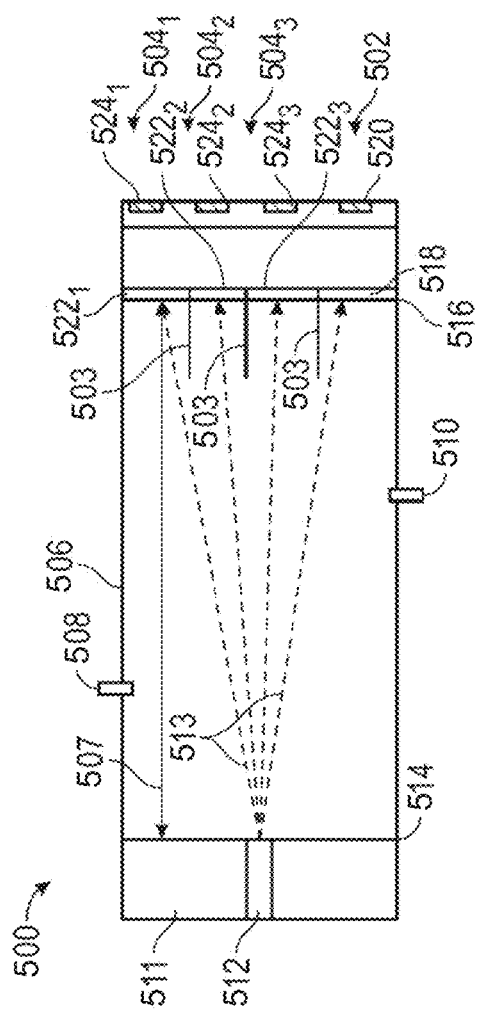
FIG. 5A is a schematic view of an example multi-channel NDIR sensor that may be used to FIG. 5B depicts an alternative configuration of an example multi-channel NDIR sensor that may be used to detect the concentration of various gases within a mixed gas.

FIG. 5A is a schematic view of an example multi-channel NDIR sensor 500 that may be used to detect concentrations of each of multiple constituent gases in a mixed gas. Similar to the sensor 400 depicted in FIG. 1, the sensor 500 includes a sample chamber 506 having a gas input 508 and a gas output 510, with an infrared light source 512 mounted in a light source mount 511 at a first end 514 of the sample chamber 506 and configured to emit light 513 in at least infrared wavelengths across the volume of gas within the sample chamber 506. The sensor 500 has an active channel 502 and a plurality of active channels 504$_1$, 504$_2$, and 504$_3$ located at a second end 516 of the sample chamber 506 opposite the light source 512 at the first end 514. Waveguides 503 may extend along at least a portion of the sample chamber 506 to separate and/or guide the light from the light source 512 to the reference channel 502 and the active channels 504$_1$, 504$_2$, and 504$_3$.

The reference channel 502 can include an optical filter 518 and a photodetector 520. Similarly, each active channel 504$_1$, 504$_2$, 504$_3$ can include an optical filter 522$_1$, 522$_2$, 522$_3$, respectively, and a photodetector 524$_1$, 524$_2$, 524$_3$, respectively. For example, the optical filters 518, 522$_1$, 522$_2$, 522$_3$ may be bandpass filters configured to pass light having a desired range of wavelengths, and/or to attenuate and/or block light having wavelengths outside the desired range. In the three-channel sensor 500 depicted, each of the three optical filters 522$_1$, 522$_2$, 522$_3$ of the active channels 504$_1$, 504$_2$, 504$_3$ may be configured to pass a different range of wavelengths, each range of wavelengths corresponding to a different one of three expected constituent gases. The optical filter 518 of the reference channel 502 may be configured to pass a range of wavelengths not heavily absorbed by the expected constituent gases associate with the active channels 504$_1$, 504$_2$, 504$_3$.

The length 507 of the sample chamber 506 may be determined based on the known infrared absorbance of the target gas or gases and the expected concentrations of the target gases. For example, a target gas with a low infrared absorbance or a target gas expected to be found in low concentration within a mixed gas may require a longer sample chamber 506 than a target gas with a high infrared absorbance or a target gas expected to be found in a higher concentration, in order to provide an optical path between the light source 512 and the detector of sufficient length to produce a detectable amount of absorption at the detectors 524$_1$, 524$_2$, 524$_3$ in the active channels 504$_1$, 504$_2$, 504$_3$.

The example multi-channel sensor 500 depicted in FIG. 5A has a reference channel 502 and three active channels 504$_1$, 504$_2$, 504$_3$, with each active channel 504$_1$, 504$_2$, 504$_3$ and the reference channel 502 including a photodetector 520, 524$_1$, 524$_2$, 524$_3$ and an optical filter 518, 522$_1$, 522$_2$, 522$_3$ configured to attenuate at least a portion of the light 513 traveling from the infrared light source 512 to the photodetector 520, 524$_1$, 524$_2$, 524$_3$ of the channel. For example, active channel 504$_1$ may have an optical bandpass filter 522$_1$ configured to selectively pass a range of wavelengths centered on a first wavelength $\lambda_1$, active channel 504$_2$ may have an optical bandpass filter 522$_2$ configured to selectively pass a range of wavelengths centered on a second wavelength $\lambda_2$, and active channel 504$_3$ may have an optical bandpass filter 522$_3$ configured to selectively pass a range of wavelengths centered on a third wavelength $\lambda_3$. Although the sensor 500 depicted in FIG. 5A includes a reference channel 502 and three active channels 504$_1$, 504$_2$, 504$_3$, any number of active channels may equally be used in accordance with the embodiments described herein. For example, the sensor may include 2, 3, 4, 5, or more active channels.

Similar to the single active channel sensor 400 depicted in FIG. 1, the photodetectors 520, 524$_1$, 524$_2$, 524$_3$ of the active and reference channels 502, 504$_1$, 504$_2$, 504$_3$ may be coupled to processing circuitry or other hardware having software and/or firmware configured to receive data from the photodetectors and store, analyze, or otherwise process the received data. As will be described in greater detail below, the processing circuitry may calculate an absorbance for each of the active channels 504$_1$, 504$_2$, 504$_3$ relative to the reference channel 502 as described above. The absorbances calculated for each wavelength range may then be used to determine a relative concentration of various constituent gases. For example, in some embodiments, the determination of relative concentrations may be achieved by solving a system of equations, such as by matrix calculations, and the number of constituent gases that can be analyzed may be equal to the number of active channels 504$_1$, 504$_2$, 504$_3$ of the sensor 500.

Figure 5B:
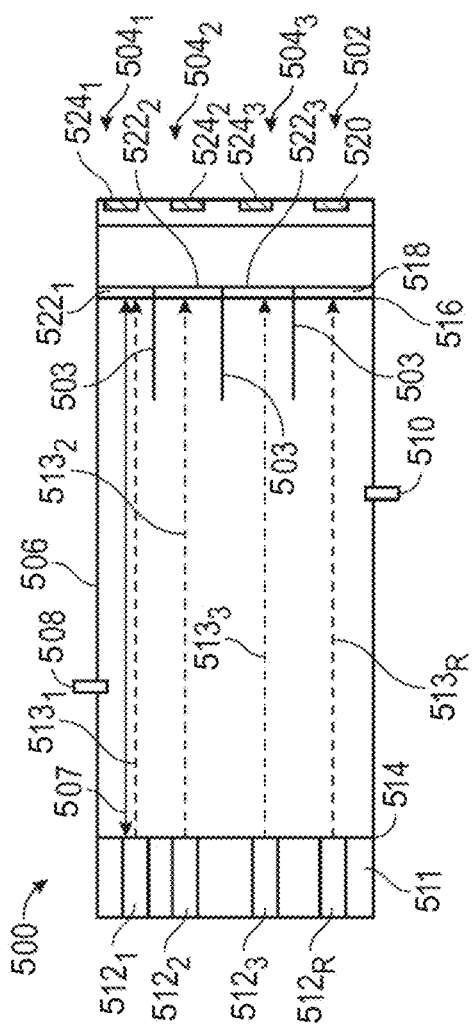

FIG. 5B depicts an alternative configuration of an example multi-channel NDIR sensor 500 that may be used to detect the concentration of various gases within a mixed gas. Similar to the configuration depicted in FIG. 5A, the sensor 500 of FIG. 5B includes a sample chamber 506 having a gas input 508 and a gas output 510, a reference channel 502, and a plurality of active channels 504$_1$, 504$_2$, 504$_3$, the reference channel 502 and the active channels 504$_1$, 504$_2$, 504$_3$ each including a detector 520, 524$_1$, 524$_2$, 524$_3$. However, the embodiment depicted in FIG. 5B includes multiple infrared light sources 542$_1$, 542$_2$, 542$_3$, 512$_R$. For example, the sensor can include one infrared light source for each channel. In the example shown in FIG. 5B, light source 512$_R$ produces a reference beam 513$_R$ for the reference channel 502, light source 542$_1$ produces a beam 543$_1$ for the active channel 504$_1$, light source 542$_2$ produces a beam 543$_2$ for the active channel 504$_2$, and light source 542$_3$ produces a beam 543$_3$ for the active channel 504$_3$.

Including a plurality of infrared light sources 542$_1$, 542$_2$, 542$_3$, 512$_R$ within the sample chamber 506 can provide several advantages. In one aspect, several light sources 542$_1$, 542$_2$, 542$_3$, 512$_R$ may provide a more uniform distribution of infrared light, reducing any error in the detected absorption at the various channels due to special disposition relative to a single light source. In another aspect, the use of multiple light sources 542$_1$, 542$_2$, 542$_3$, 512$_R$ may allow for a customized spectrum in each channel or a more finely tuned spectrum across all channels. For example, a particular mixed gas composition may be best analyzed using a spectrum of infrared light that cannot be generated by a single available light source. However, a desired spectrum may be achievable by a combination of light sources, each configured to produce a different spectrum of infrared light.

In another example, the plurality of infrared light sources 542$_1$, 542$_2$, 542$_3$, 512$_R$ may be independently operable, such that a sample gas may first be analyzed under a first spectrum of infrared light (e.g., only a first one of the multiple infrared light sources 542$_1$, 542$_2$, 542$_3$, 512$_R$ is powered), and may subsequently be analyzed under one or more different spectra of infrared light (e.g., only a second one of the multiple infrared light sources 542$_1$, 542$_2$, 542$_3$, 512$_R$ is powered). In yet another example, each waveguide 503 may extend the full length 507 of the sample chamber 506 such that each channel 502, 504$_1$, 504$_2$, 504$_3$ is illuminated by a separate light source 542$_1$, 542$_2$, 542$_3$, 512$_R$ without mixing of light from multiple infrared emitters. In such embodiments, each channel 502, 504$_1$, 504$_2$, 504$_3$ may have an identical filter 518, 522$_1$, 522$_2$, 522$_3$ such that the spectrum detected at each detector is determined based on the tuning of the light sources 542$_1$, 542$_2$, 542$_3$, 512$_R$, rather than the bands passed by the filter 518, 522$_1$, 522$_2$, 522$_3$. In other embodiments, each channel 502, 504$_1$, 504$_2$, 504$_3$ may have a different optical filter 518, 522$_1$, 522$_2$, 522$_3$ and an identically or differently tuned infrared light source 542$_1$, 542$_2$, 542$_3$, 512$_R$.

In any of these embodiments, selective activation of various light sources 542$_1$, 542$_2$, 542$_3$, 512$_R$ may be automatically controlled by a computing system (such as a programmed microcontroller). For example, a sensor system (e.g., a sensor and an associated microcontroller) may be configured to automatically cycle the infrared sensors repeatedly to obtain the corresponding measurements from one or more photo detectors. In one example, the sensor system may include four infrared light sources 542$_1$, 542$_2$, $542_3$, $512_R$ that are alternatively activated for x seconds each (e.g., <1 second to multiple seconds) to obtain various readings.

Determining the relative concentrations of the constituent gases in a mixed gas can facilitate several advantageous implementations. In one example, the calibration systems and methods described herein can be used to improve the accuracy of the detection of a single target gas. For example, where the concentration of methane is to be detected in a mixture of natural gas and air (e.g., where possible constituents of natural gas that may be present in the air is not known), the absorption contributions due to ethane and propane in the natural gas can accurately be corrected for, and a more precise concentration of methane can be determined.

In another example, the systems and methods described herein can be used to determine the relative concentrations of an unknown mixture of gases. For example, in the case of natural gas leak detection, it may be known that a mixture of air and natural gas will include methane, ethane, and propane. A sensor having active channels tuned to detect methane, ethane, and propane as described herein may be configured both to detect the presence of such gases, as well as to provide an indication of the relative concentrations of the gases within detected natural gas. In some instances, such a categorization of the constituent gases may be useful for identifying the source of a gas leak, such as where a plurality of natural gas compositions are present in the same vicinity.

Other Example Variations

In general, the microprocessors and/or computing discussed herein may each include on or more "components" or "modules," wherein generally refer to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or can be written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

The term "non-transitory media," and similar terms, as used herein refers to any media that store data and/or instructions that cause a machine to operate in a specific fashion. Such non-transitory media can comprise non-volatile media and/or volatile media. Non-volatile media includes, for example, optical or magnetic disks, such as storage device. Volatile media includes dynamic memory, such as main memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A system comprising:
a flow valve coupled to a gas inlet of a landfill gas system;
a pump coupled to the flow valve and configured to draw gas from the landfill gas system via the gas inlet;
an exhaust port configured to direct the gas into a methane detection device, wherein the methane detection device is configured to detect at least a methane concentration in the gas;
a static pressure transducer positioned between the flow valve and the gas inlet, the static pressure transducer configured to sense a static pressure when the flow valve is in a closed position;

a barometric pressure transducer coupled to the gas inlet, the barometric pressure transducer configured to sense an atmospheric pressure via a path to the atmosphere;

a main board comprising a computer processor and a plurality of receiving connectors each configured to mechanically and electronically couple with any one of a plurality of smart sensor block assemblies, wherein the receiving connectors provide respective communication paths between the computer processor and the coupled smart block assemblies;

a plurality of smart sensor block assemblies configured to sense concentrations of a respective plurality of chemicals in the gas, each smart sensor block assembly comprising:

a chemical sensor configured to access the gas drawn from the landfill gas system and to output sensor data indicative of a concentration of one of the plurality of chemicals in the gas;

a memory storing predetermined calibration data generated and stored in the memory prior to installation of the smart sensor block assembly with the main board; and an adapting connector removably mechanically and electronically coupled to one of the receiving connectors of the main board, the adapting connector configured to transmit the predetermined calibration data and the sensor data to the main board via the adapting connector; and a communication interface coupled to the computer processor and configured to communicate the sensed data to a mobile control device, wherein the main board is configured to apply the predetermined calibration data from each smart sensor block assembly to the corresponding sensor data to determine adjusted sensor data that is normalized with reference to other sensors.

2. The system of claim 1, further comprising a pitot tube housing a static pressure tube coupled to the static pressure transducer and a total pressure tube coupled to a differential pressure transducer configured to measure a total pressure, wherein velocity pressure is determinable as a difference between the total pressure and the static pressure.

3. The system of claim 2, wherein the pitot tube is positioned within an inlet pipe of the landfill gas system.

4. The system of claim 1, further comprising an orifice plate positioned between an upstream pressure sensor and a downstream pressure sensor, wherein the upstream pressure sensor is positioned to sense an upstream pressure of gas flowing through the landfill gas system prior to flowing through the orifice plate and the downstream pressure sensor is positioned to sense a downstream pressure of gas flowing through the landfill gas system after flowing through the orifice plate.

5. The system of claim 4, wherein the system is configured to calculate a flowrate based on the upstream pressure and the downstream pressure.

6. The system of claim 1, further comprising a differential pressure transducer (172) positioned between the flow valve and the gas inlet, the differential pressure transducer configured to sense a total pressure.

7. The system of claim 1, wherein opening and closing of the flow valve is controlled via communications from the mobile control device.

8. The system of claim 1, wherein the static pressure and barometric pressure are usable to normalize the sensed data.

9. The system of claim 1, wherein at least one of the chemical sensors comprises an oxygen sensor that does not require calibration.

10. The system of claim 1, wherein the methane detection device is configured to:

determine a temperature of a light source;

based on the determined temperature, initiating activation of a cooling or a heating component associated with the light source to adjust the temperature to a predetermined first operating temperature, wherein the first operating temperature is selected to produce a light beam from the light source at a first preselected wavelength for absorption by the first preselected gas;

when the temperature of the light source has reached the first operating temperature, accessing measurement data from an optical detector, wherein with the light source at the predetermined first temperature the detection system is configured to measure a first absorption of the light beam at the first preselected wavelength to provide an indication of a concentration of the first preselected gas within the sample gas;

continuing to sample the environment by accessing the measurement data until the concentration of the first preselected gas exceeds a predetermined threshold; and responsive to the concentration of the first preselected gas exceeding the predetermined threshold:

initiating activation of a cooling or heating component associated with the light source to adjust the temperature to a predetermined second operating temperature, wherein the second operating temperature is selected to produce a light beam from the light source at a second preselected wavelength for absorption by the second preselected gas; and when the temperature of the light source has reached the second operating temperature, accessing measurement data from the optical detector, wherein with the light source at the predetermined second temperature the detection system is configured to measure a second absorption of the light beam at the second preselected wavelength to provide an indication of a concentration of the second preselected gas within the sample gas.

11. The system of claim 1, wherein the memory of each smart sensor block assembly further stores predetermined configuration data comprising one or more of a first sensor type, information identifying the first chemical property, or performance characteristics of the first sensor.

12. The system of claim 11, wherein the predetermined configuration data includes one or more of an operating range of the first sensor or instructions to perform one or more mathematical operations on the first sensor data.

13. The system of claim 1, wherein the plurality of chemicals include one or more of Carbon monoxide, Hydrogen sulfide, Hydrogen, Tertio Butyl Mercaptan, or Tetrahydrothiophene.

* * * * *